(12) United States Patent
Ferrara et al.

(10) Patent No.: US 12,367,531 B1
(45) Date of Patent: Jul. 22, 2025

(54) PERSONALIZED SOCIAL NETWORK SYSTEM

(71) Applicant: CoCreateX Inc., Saint Paul, MN (US)

(72) Inventors: Mariangela C. Ferrara, Saint Paul, MN (US); Nicholas Powley, Saint Paul, MN (US); Lyno Sullivan, Woodbury, MN (US); Trevor Laughlin, Saint Paul, MN (US)

(73) Assignee: CoCreateX Inc., Saint Paul, MN (US)

( * ) Notice: Subject to any disclaimer, the term of this patent is extended or adjusted under 35 U.S.C. 154(b) by 334 days.

(21) Appl. No.: 17/940,854

(22) Filed: Sep. 8, 2022

Related U.S. Application Data

(60) Provisional application No. 63/241,756, filed on Sep. 8, 2021.

(51) Int. Cl.
*G06Q 50/00* (2024.01)
*G06F 16/955* (2019.01)
*G06K 7/14* (2006.01)

(52) U.S. Cl.
CPC ......... *G06Q 50/01* (2013.01); *G06F 16/9554* (2019.01); *G06K 7/1417* (2013.01)

(58) Field of Classification Search
CPC ... G06Q 50/01; G06F 16/9554; G06K 7/1417
See application file for complete search history.

(56) References Cited

U.S. PATENT DOCUMENTS

| | | | |
|---|---|---|---|
| 2016/0078033 A1* | 3/2016 | Brucher | G06F 16/41 707/E17.014 |
| 2017/0308929 A1* | 10/2017 | Li | G06Q 30/0277 |
| 2019/0057161 A1* | 2/2019 | Ackerman | G06F 16/29 |
| 2020/0366484 A1* | 11/2020 | So | H04L 9/3213 |
| 2021/0217106 A1* | 7/2021 | Hauser | H04L 67/52 |

* cited by examiner

*Primary Examiner* — Ann J Lo
*Assistant Examiner* — Fernando M Mari Valcarcel
(74) *Attorney, Agent, or Firm* — Husch Blackwell LLC

(57) ABSTRACT

A system and method whereby a group of people can privately, or in an online location with a singular purpose, share a website, social network, or other communications for a particular event. A personalized social network can be generated for the group to enhance privacy, security, and ease of interaction. The personalized social network can be associated with a place, time, or other conditions, such that the social network can effectively address a singular purpose, such as a wedding, and all group members can easily communicate information relative to the event.

8 Claims, 12 Drawing Sheets

PERSONALIZED SOCIAL NETWORK SYSTEM

RELATED APPLICATION

This application claims the benefit of U.S. Provisional Application No. 63/241,756 filed Sep. 8, 2021, which is hereby fully incorporated herein by reference.

TECHNICAL FIELD

The present disclosure relates generally to interactive event coordination and more particularly to integration of all event-related activities into a personalized social network management system.

BACKGROUND

For a traditional event or large gathering, such as a wedding, the event organizers must research and purchase a variety of goods and services from disparate sources, such as catering and photography services. This process can be exhausting for large-scale events and can often require the event organizer to hire a third party to assist with the process. Another challenge of organizing traditional events is sharing information between attendees before, during, and after the event. Thus, there is a need for a system that can assist with coordinating an event while connecting attendees in a meaningful way.

SUMMARY

Embodiments of the present disclosure relate to a method for generating a personalized website for an event among other concepts. Embodiments of the present disclosure relate to a method for generating personalized merchandise for an event among other concepts.

In an embodiment, a method for generating a social network system includes connecting, by a user interface, a plurality of available websites each with at least one unique URL and at least one associated unique programmed key; creating a set of tags, wherein each tag in the set of tags includes a QR code and a personalization area, such that the QR code directs a user to the user interface and the personalization area includes at least one unique programmed key; providing a tag among the set of tags with the QR code and at least one unique programmed key to a user; and scanning the QR code, by the user, with a user device; subsequent to scanning the QR code, presenting to a user device, the user interface configured to enable selection of one of the plurality of available websites based on a programmed key associated with the one of the plurality of available websites. In embodiments, the method further comprising enabling the user to define access permissions and otherwise customize the selected website via the user interface.

In an embodiment, a method for generating a personalized website for an event includes accessing a plurality of available websites each with a unique URL, creating a set of programmed keys or keys, wherein each key in the set of keys is associated with one of the plurality of available websites, presenting to a user device, a user interface configured to enable selection of one of the plurality of available websites with an associated key, providing the set or subset of keys associated with the selected website to a user of the user device, and enabling the user to utilize defined access permissions to access the website via the user interface. In embodiments, the method further comprising enabling the user to utilize access permissions that have been customized for the user and the selected website via the user interface.

In an embodiment, a method for generating a personalized user experience includes associating a plurality of available websites each with a unique URL, creating a set of tokens or tags, wherein each token or tag in the set of tokens or tags includes an area for a programmed key, optionally to be hand written, and an area for an autograph, optionally to be hand written, and a QR code linked to a programmable keyed portal where each programmed key of the programmable keyed portal is associated with one of the plurality of available websites, presenting to a user device, a user interface configured to enable selection of one of the plurality of available websites via the user interface.

In an embodiment, a personalized user experience includes accessing an online database of a plurality of available websites each with a unique URL, creating a set of tokens or tags, wherein each token or tag in the set of tokens or tags includes an area for a programmed key and an area for an autograph, and a QR code linked to a programmable keyed portal where each programmed key of the programmable keyed portal is associated with one of the plurality of available websites, presenting to a user device, a user interface configured to enable selection, via entry of the programmed key, of one of the plurality of available websites via the user interface.

In an embodiment, a personalized user experience includes an aggregator, optionally available via the programmable keyed portal, that accesses content associated with the plurality of available websites.

In an embodiment, a personalized user experience includes an aggregator, optionally available via the programmable keyed portal, that accesses content associated with the plurality of available websites, and makes that content interactive by using an Application Programming Interface (API) belonging to one or more of the plurality of available websites.

In an embodiment, a personalized user experience includes an aggregator, optionally available via the programmable keyed portal, that accesses content associated with the plurality of available websites, and makes that content interactive by using an Application Programming Interface (API) belonging to one or more of the plurality of available websites, such that interactions with the content pass data back to the websites with which the content is associated.

In an embodiment, a domain or a URL may represent a record company. In an embodiment, a domain or a URL may represent a top level of a taxonomy and a subdomain of a domain or URL may represent a specific user or a specific topic. A subdomain may exist only to aggregate to others within or outside the network of interest.

In one embodiment, sites on each subdomain may possess one or more accounts belonging to one or more users who are able to act on behalf of the administrator. In one embodiment representing the open use of a social network, people visiting the social network do not require a User account before visiting or during a visit to the social network. Instead, a user when visiting a social network enabling open use, is provided with a set of tools to create a username, a private key, and a public key, where the username and public key are listed on the public site directory. In this embodiment, a measure of accountability ensures that the sender and the contents are uncompromised and or unaltered. In this embodiment, communications between users and communications between users and the social network, such as a post, are ensured to be uncompromised.

In one embodiment, end to end encryption mechanisms may be utilized whereby a first user can send an encrypted message to a second user whereby the second user confirms their identity by cross-referencing a public key, further describable as their public key, with a private key. This end to end encryption mechanism is sometimes known as Pretty Good Privacy or public key encryption.

In one optional embodiment, a removable film may refer to a substrate which can be scratched off. In one optional embodiment, a removable film may refer to a substrate which can be scratched off with a tool. In one optional embodiment, a removable film may refer to a substrate which can be peeled off.

In one embodiment, a first programmable keyed portal can pass a user from the first programmable keyed portal to a second programmable keyed portal. In one embodiment, a first programmable keyed portal can pass a user from the first programmable keyed portal to a second programmable keyed portal and on to a target URL using a first key to pass the first programmable keyed portal and a second key to pass the second programmable keyed portal.

An object of the present invention is to provide a person with a personally owned social network that is located at, or is portable to its own URL, and is served by, or portable to be served by, its own virtual server.

An object of the present invention is to provide a person with a personally owned social network that is located at, or is portable to its own URL, and is served by, or portable to be served by, its own virtual server in one minute and by pressing one button.

An object of the present invention is to provide a person with a personally owned social network that is located at, or is portable to its own URL, and is served by, or portable to be served by, its own virtual server, the processing power for which is provided by a decentralized server system.

An object of the present invention is to provide a person with a personally owned social network that is located at, or is portable to its own URL, and is served by, or portable to be served by, its own virtual server, the processing power for which is provided by a decentralized server system, whereby any server can separately or together contribute processing power to the virtual server.

An object of the present invention is to provide a person with a personally owned social network that is located at, or is portable to its own URL, and is served by, or portable to be served by, its own virtual server, that is further capable of operating locally with no internet connection, but in connection with other devices together comprising a mesh network via the Interactive Connectivity Establishment (ICE) protocol.

An object of the present invention is to provide a person or entity with a social networking platform that exists and is able to be owned in one minute and with one button that is portable to its own URL and its own virtual server, where its virtual server provides a digital interface for screened or immersive user experiences that incorporate at least one of: a website, a programmable keyed portal, a social networking experience, an e-commerce experience, a cryptocurrency, a blockchain, a builder for building new social networking platforms, or an aggregator, all of which are optionally enhanced by a relational scheduling algorithm.

An object of the present invention is to provide a person or entity with a social network that exists and is able to be owned in one minute and with one button that is portable to its own URL and its own virtual server, and can operate in connection with any other social network via APIs and the internet.

An object of the present invention is to provide a person or entity with a social network that exists and is able to be owned in one minute and with one button that is portable to its own URL and its own virtual server, and can operate in connection with any other social network via APIs and a mesh network using the ICE protocol.

An object of the present invention is to provide a first social network with the ability to launch second and subsequent familiar and connected social networks where content can be broadcast out from the second and subsequent familiar and connected social networks to other social networks provided by different services where further data related to the broadcast content from the second and subsequent social networks can flow back through the second and subsequent social networks to the first where it can be visualized and or utilized.

An object of the present invention is to provide a social network with an emergency stop button or stop button that can be used to halt the action, behavior, or performance of the social network at the discretion of the user.

An object of the present invention is to provide a social network that interprets the content of posts as commands input into a command prompt. An object of the present invention is to provide a social network that interprets the content of posts as commands input into a command prompt that causes an action or reaction by the social network. An object of the present invention is to provide a social network that interprets the content of posts as commands input into a command prompt that causes an action or reaction by the social network such as connecting to and aggregating content from another social network.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
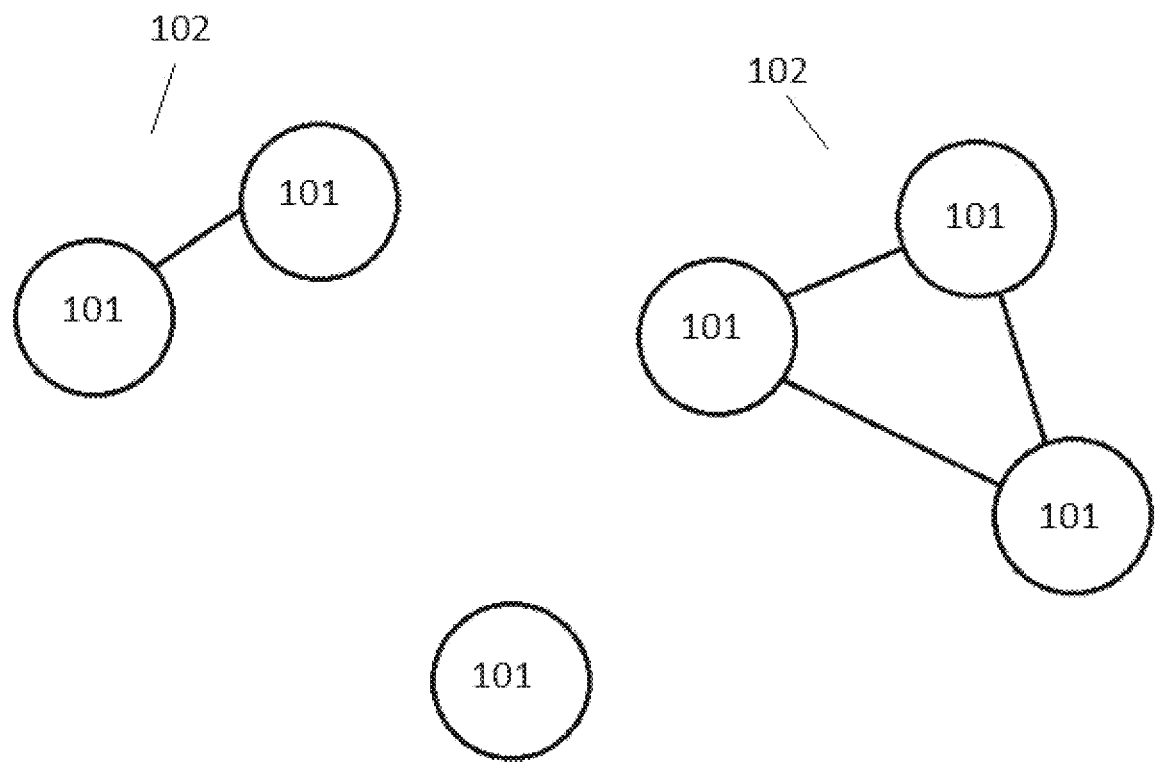
FIG. 1 is an illustration of a high-level diagram representing a network or network of networks and their potential connectable configurations.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The present disclosure presents a system and method whereby a group of people can privately, or in an online location with a singular purpose, share a website, social network, or other communications for a particular event with ease. To accomplish this end, a personalized social network can be generated for a group to enhance privacy, security, and ease of interaction. The personalized social network can be associated with a place, time, or other conditions, such that the social network can effectively address a singular purpose, such as a wedding, a concert or other social gatherings.

FIG. 1 depicts a network 101 or a network of networks 102 that may be associated with a website, social network, or other communications for a particular event and accessible by one or more members of a group. Each network 101 may be communicatively connected between each other. In embodiments, each network 101 may establish a possible connection between the network 101 or networks 102 they represent and other networks. In embodiments, individual networks 101 or networks of networks 102 may be invisible or visible to other networks 102. In embodiments, a visible network may not be connectable to other networks. Networks 101/102 may publish or subscribe to other networks and may call for the publication of content from other networks. In embodiments, networks 101/102 may exist and connect to each other via the internet or world wide web. In embodiments, networks 102 can exist may connect to each other via the Interactive Connectivity Establishment (ICE) Protocol, exclusive of an internet or world wide web connection. Networks 101/102 may exist and connect to each other vie the ICE Protocol with supplementary connectivity via an internet or world wide web connection.

Figure 2:
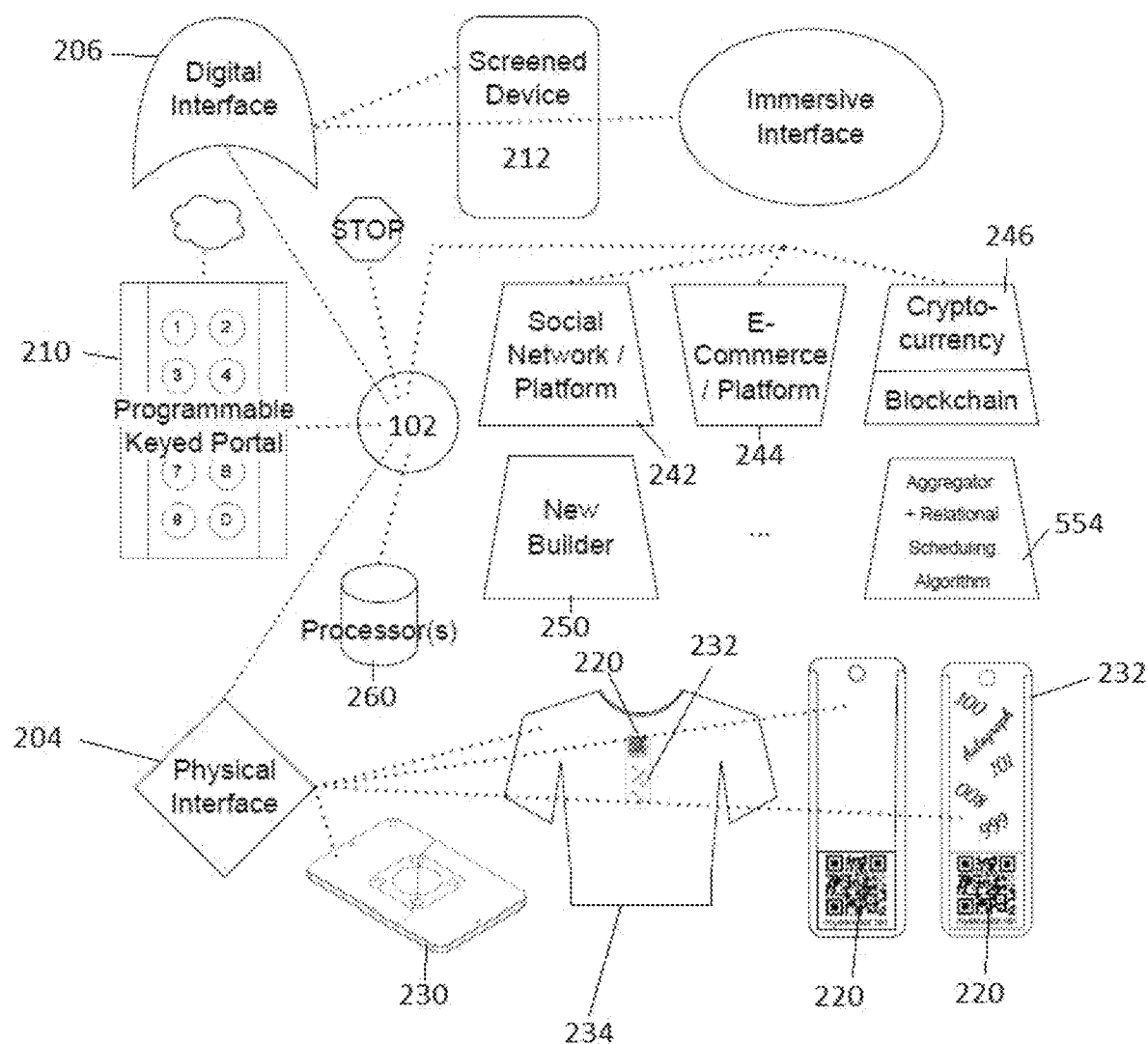
FIG. 2 is a schematic diagram of a network, according to an embodiment.

FIG. 2 depicts a high-level diagram of each network or network of networks 102. In embodiments, each network or network of networks 102 may comprise a physical interface 204 and a digital interface 206. The physical interface 204 and the digital interface 206 are communicatively connected such that the physical interface 204 transports a user to the digital interface 206. In embodiments, the digital interface 206 may include a programmable keyed portal 210, accessible through a screened device 212 (e.g., cellphone, computer, etc.), that connects the physical interface 204 to the digital interface 206 such that the programmable keyed portal 210 transports a user from the physical interface 204 to the digital interface 206. The digital interface 206 is configured to transport a user to a variety of network platforms based on programmable keyed portal 210 input. In embodiments, the physical interface 204 may include one or more tokens (not depicted), a writeable tag 232, an article (not depicted), a textile article 234, a box (including additional items for transporting a user to a digital interface) 230, etc. that includes information to be inputted in the programmable keyed portal 210 which directs the user to a particular network/platform. In embodiments, a user may create or access their own social network/platforms, portable to their own URL and their own virtual server. In embodiments, a user may access other social networks/platforms not created or owned themselves. The virtual server comprising a social networking layer 242, an ecommerce layer 244, a blockchain 246, a cryptocurrency layer 248, etc., wherein the virtual server may utilize processing power provided by any processor 260. In embodiments, the virtual server may comprise a new builder layer 250 in which information may be added, deleted, modified etc. by one or more users that have access to the virtual server. In embodiments, the virtual server may comprise a new builder layer 250 with which a new network 102 can be created and connected.

In embodiments, each member of a group may be given a unique token or ID card. Each token can be assigned a unique identifier specific to a user, event, or both. In such embodiments, each token can include a QR code 220 incorporating a graphic identifying a user or event associated with the token. In embodiments a radio frequency identification (RFID) tag or near field communication (NFC) can also be incorporated into each token to provide further connectivity and association capabilities.

In embodiments, tokens can be created as part of a set or group such that all tokens of a set can communicatively access a private website or social network. The group of tokens and accompanying website or social network can then be customized for purposes specific to an event.

In embodiments, a marrying couple can plan their wedding and associated products and services well in advance. The marrying couple can be given or purchase a group of tokens and then customize an associated social network to their preferences. In embodiments, the associated social network can include information about one or more of a time for the wedding, a venue, a gift registry, a guest list, an assigned table layout, a gallery of pictures, or other information relevant to a couple's wedding. In embodiments, a live feed of the wedding may be captured and broadcast to remote audiences via the private social network or website. In embodiments, a user can pay up front for the tokens. In some embodiments, the tokens can be packaged with other goods or services to simplify the planning process for an event. As such, it becomes possible to quickly aggregate a plurality of goods and services associated with an event in a private social network. The private social network can then be used to track expenses and details for the event separate from functionality associated with connecting guests.

Figure 3A:
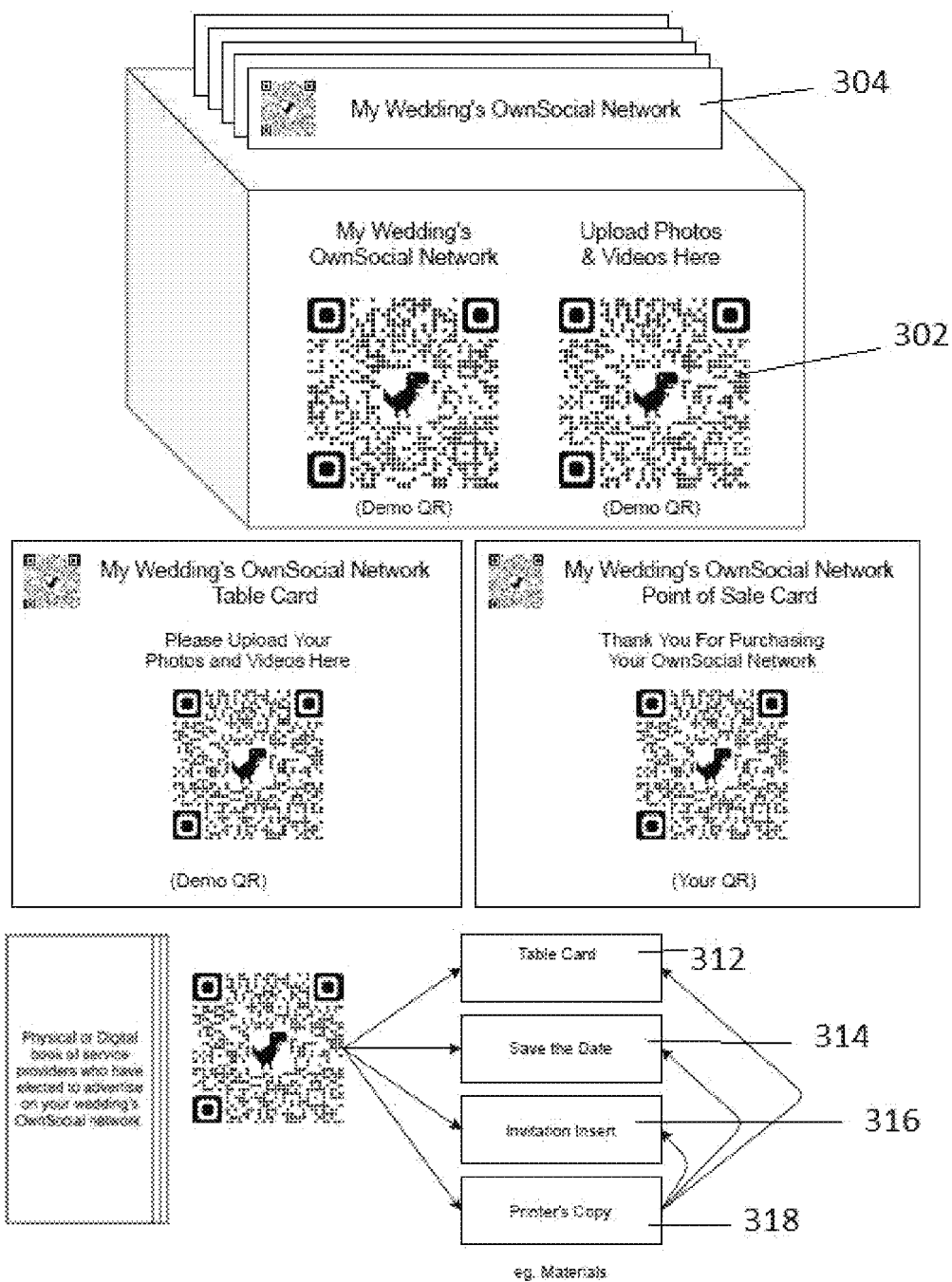
FIG. 3A is an illustration of a set of tokens, according to an embodiment.
Figure 3B:
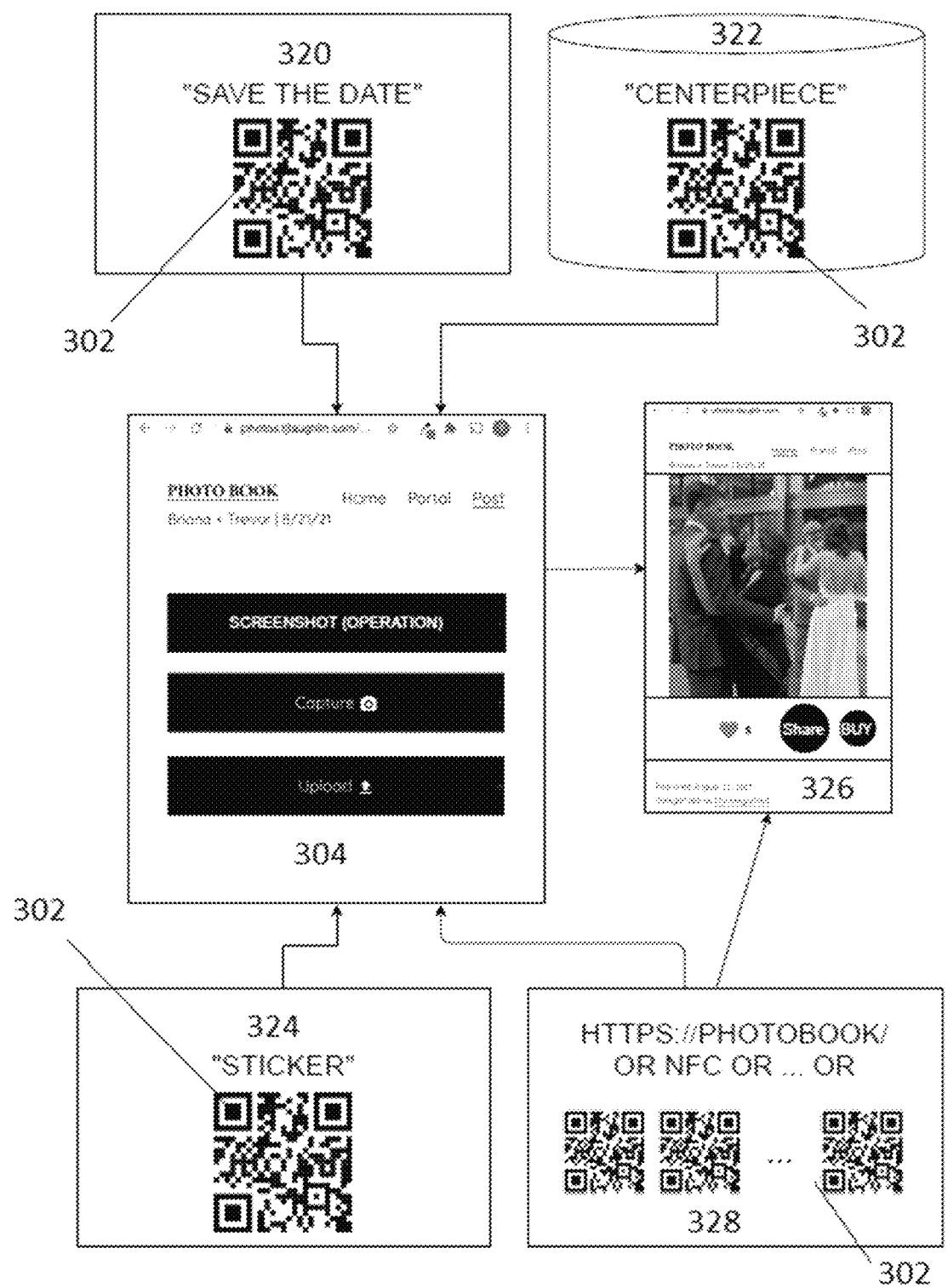
FIG. 3B is a diagram of accessing a personalized website, according to an embodiment.
Figure 3C:
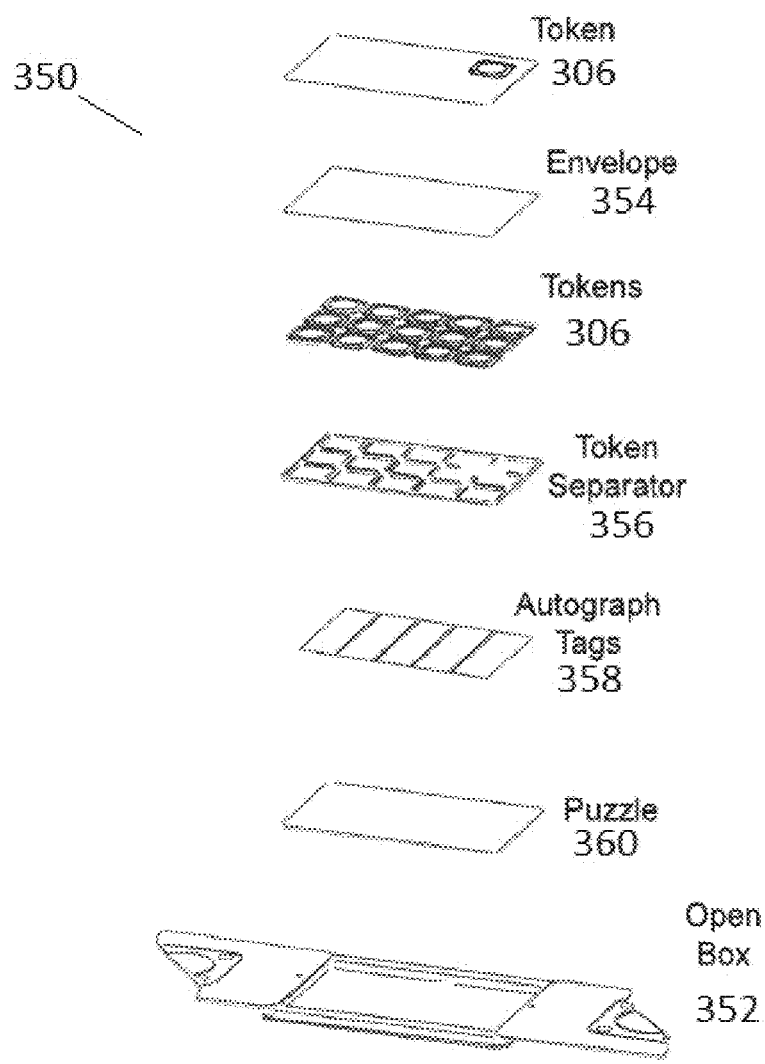
FIG. 3C is an illustration of an invitation, according to an embodiment.

Referring to the wedding example, FIGS. 3A-C depict utilizing a set of tokens 306 that can be sold along with goods and services such as invitations 350 (such as "save the date" 320 invitations), a décor package (such as table centerpieces 322, stickers 324, photobooks and other variety of items 326), or catering services. Embodiments of the invention enable a couple to provide each guest with an event participation token that can be delivered along with an invitation. In some embodiments, the tokens can be designed as invitations. Once the tokens have been distributed to guests the guests can simply scan the token 306 or a QR code 302 on the token to access the wedding's private website 304 ("My Wedding's OwnSocial Network"). Then, anytime in the future when the guest wants to get to the couple's website, they only need to rescan.

Referring to FIG. 3C, in embodiments, mailable cards or group of cards (not shown) may be placed into a mailable envelope or mailable box 352 that can be bought and mailed. In embodiments, a mailable envelope or mailable box 352

(e.g., an invitation) may include one or more of tokens 306, envelopes 354, a token separator 356 to carefully separate the tokes 306 and autograph tags 358, as described herein, to facilitate easier event participation and information accessibility. In embodiments, an additional item, such as a puzzle 360, may be included within a mailable envelope or mailable box 352. For example, such item may be utilized as a distraction to those that would otherwise not need the information and pertinent items within the mailable envelope or mailable box 352 (e.g., recipients of the invitation may give the puzzle to distract their kids such that the kids refrain from playing with and, potentially, losing the other more valuable items). In embodiments, guests' menu selections and RSVPs can be input to the private social network and sent to the people who are marrying as well as the invitation printer or the caterer where applicable. In embodiments, the one or more tokens may be implemented to direct the user to personalized information incorporated by the purchaser of the one or more tokens. Relating to the wedding example, the QR code may digitally direct to an invitee's table information (i.e., table cards) 312, save the date 314 (with time, date, location, and various other event information), invitation inserts 316 or printable copies 318. In embodiments, the tokens can include one or more of QR codes, near field communication (NFC) tags, RFID tags, or Bluetooth beacons to enable users to efficiently connect to a personalized website or social network.

In embodiments, social network content generation incentives or programs can be offered or conducted, e.g., a raffle for content with most likes or short well wishes to people who are marrying. In some embodiments, traditions such as, "throwing money," at the people who are marrying can be digitized with the inclusion of many additional services such as payment apps, application programing interfaces, or embedding code. In embodiments, immersion or ice breaking activities can be offered to tables or other groups of guests via the social network or website.

In embodiments, wedding attendees can mark their origination (hometown) locations on a virtual map to show how far they have come to visit the wedding. Wedding attendees can additionally mark their in-town location so everyone can see their proximity to others and coordinate transportation and events. In embodiments, the virtual map can be a 3D rendering using virtual or augmented reality.

In embodiments, a spouse's story and how the set of tokens integrates with their life from proposal to honeymoon is captured and memorialized in a social network of the present disclosure. Additional relevant milestones where the social network of the present disclosure can be implemented include but are not limited to the purchase of the ring, proposal, engagement photos, engagement party, bridal shower, bachelor party, bachelorette party, rehearsal dinner, wedding, opening of presents, honeymoon, and on into life after marriage.

Figure 4:
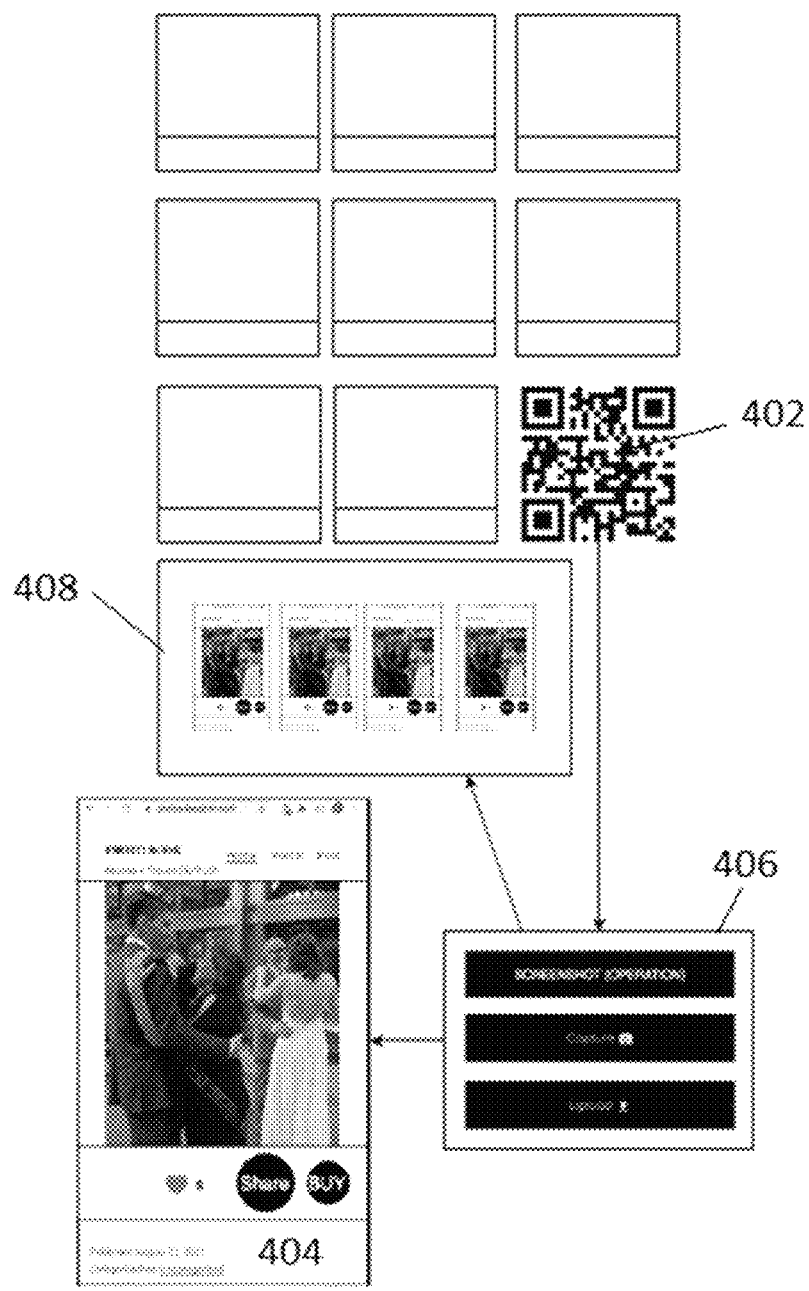
FIG. 4 is a flow chart of an autographing method, according to an embodiment

FIG. 4 depicts a diagram of accessing a media library of a personal website, according to an embodiment. In embodiments, a set of tokens can be used for sharing attendee photos by allowing attendees to upload photos, via an interface 406, to a private website or social network 404 associated with the tokens and the QR code 402. In embodiments, the ability to upload photos or access photos uploaded to a media library 408 can be password protected or otherwise secured behind a means of authentication, such as a login process. In such embodiments, printing, publishing, or licensing vendors or agents can be incorporated into the set of tokens by enabling the printing or publishing of photos or videos directly from the media library. Users can purchase published content directly from a purchase button available on a post to the associated website.

In embodiments, if a guest or invitee email list is available, each invitee can be uploaded to the site so that only invitees can access the site and conduct the moderation function. In some embodiments, a private website can be built in parallel so if the event presents a security concern, the public website can be immediately shut down and a private website can be utilized instead. Systems and methods of the present disclosure can be conducted on a local network that is not connected to the broader internet for the purpose of maximizing security.

In embodiments, open or community moderation capabilities can be used by the audience to moderate the social network content in real-time. In embodiments, open moderation is a moderation function whereby a person who is not logged in can moderate a post on a public website associated with a set of tokens. Open moderation includes functionality whereby a post can be hidden from the website, where the title can be updated, or where other edits, improvements, corrections, curations can be applied to the website without being logged in.

Referring again to the wedding example, a sales agent can meet with a buyer of the token wedding set. In embodiments, goods and services can be sold together or packages can be provided. Table 1 presents a sample sales receipt of such a transaction.

TABLE 1

Sales Receipt for Token Wedding Set

| Cost | Qty. | Description | Notes |
| --- | --- | --- | --- |
| $1,000 | 1 | Bus for day at $1,000 | |
| $220 | 1 | Wedding Planner Kit provides CCX Token Registry sign-in process and keepsake laser cut cover with custom artwork in 12 inch by 12 inch size | $1.50 per square inch (144 square inches) |
| $800 | 40 | CCXcoin Wedding Invitation mailed to each recipient for presentation at the wedding and official. It includes an RSVP follow email capability. Cost is $20 per Wedding Token plus cost of card. | $20 per token |
| $120 | 1 | Wedding Book Media endpoint for aggregating photos, recordings and such. Everybody can share media into the sharing endpoint. The resulting wedding albums are accessible from cloud storage. Bridal Shower -- engagement party- Bachelorette party -- Bachelor Party Wedding Dinner -- Ceremony - Toast Wedding Planner -- Food Caterers | $10 per month, 12 month minimum |

TABLE 1-continued

Sales Receipt for Token Wedding Set

| Cost | Qty. | Description | Notes |
|---|---|---|---|
| | | Band or Ensemble | |
| | | Any of these events can be sold through advertising. | |
| | | Actors -- Couple -- Bride/s Groom's | |
| $80 | 800 | High-Fives and "Thank You" messages for each invitee and attendee | $.10 each |
| $2,300 | | Total CCX Wedding Bill | |
| $690 | | Overhead, commission, taxes | 30% taxes & fees & commissions |
| $2,990 | | Total Invoice Amount $USD | |

In embodiments, a couple can pay up front for at least the actual expenses in producing the wedding products. The wedding kit can be printed at the date specified in the sales contract by the token providing company. Upon the payment clearing, all of the 3D printed, and laser cut products can be created by the token providing company.

Figure 5:
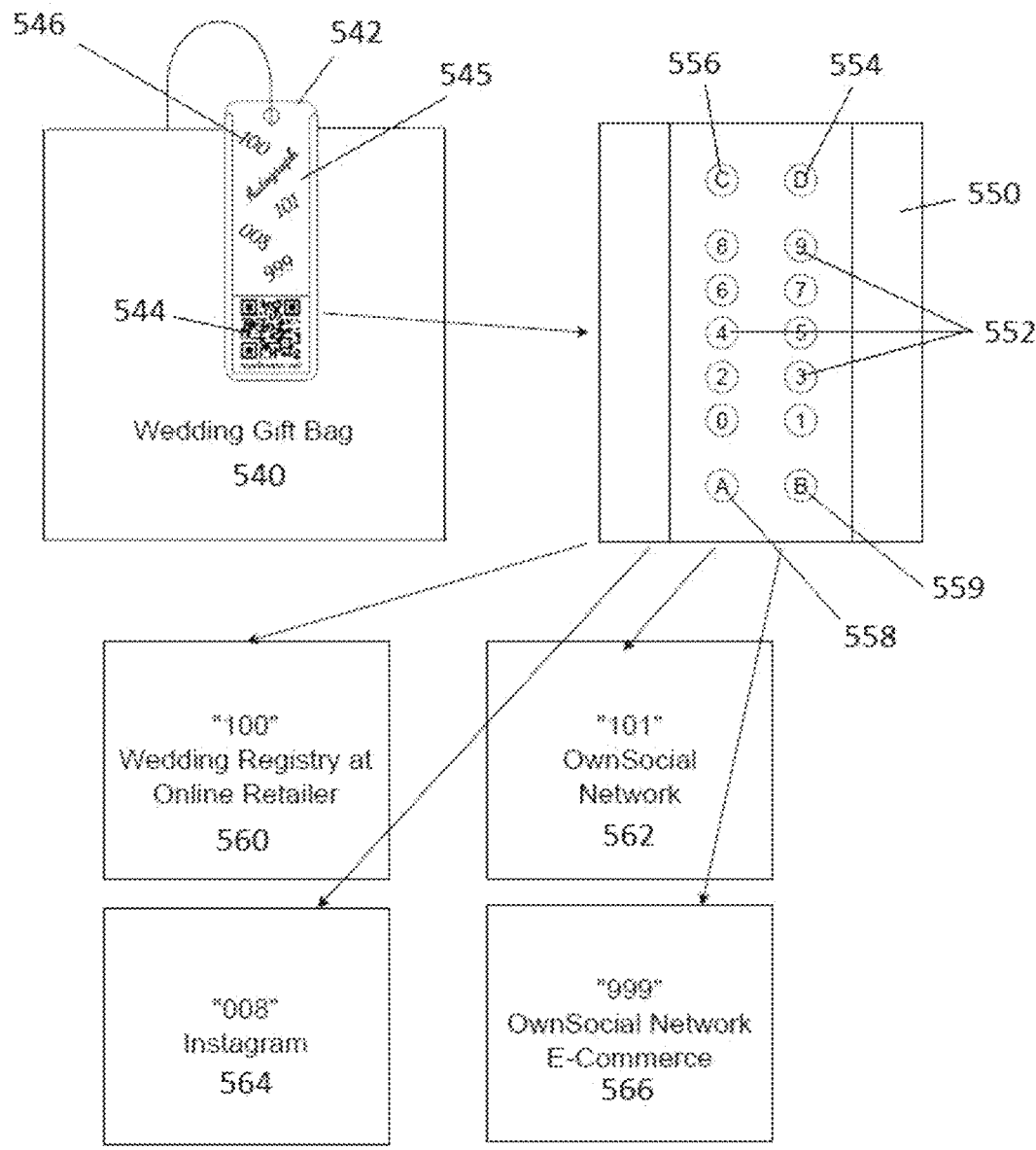
FIG. 5 is a flow chart of an autographing method, according to an embodiment.

FIG. 5 depicts an article, such as a wedding gift bag 540, implemented with a tag 542 as described herein. In embodiments, the tag 542 may include an autograph area 545 such that a person may autograph or write information on the tag 542 intended for an attendee of an event, such as a wedding. The tag may correspond to a link to a website or digital place in which the recipient may be directed. In embodiments, a person receiving the wedding gift bag 540 with the tag 542 may follow the link to a website or digital place via scanning an associated QR code 544. In embodiments, one or more code stings 546 may be provided to the recipient as part of the autographing of the tag 542. For example, a code string 100 may be written on tag 542. When an attendee scans the QR code 544 and is directed to a programmable keyed portal 550, the attendee may input the code string into the digital interface, in which case the attendee will be directed to a wedding registry at an online retailer 560 (i.e. an alternative website or digital place). In yet another example, attendee may input code string 101, in which case the attendee is directed to their own, individually created "OwnSocial" network 562 (further described with reference to FIG. 6. In yet another example, attendee may input code string 008, in which case the attendee may be directed to a more public website or digital place, such as Instagram 564, Facebook, Twitter, etc. In yet another example, attendee may input code string 999, in which case the attendee is directed to their own, individually created "OwnSocial" network E-commerce 566.

In embodiments, a digital interface for code string input may be a programmable keyed portal 550, much like a floor level input interface of an elevator, with a plurality of input capabilities (e.g., buttons). In embodiments, the code string input may be extended from 1 to n digits associated with 1 to n input capabilities 552 integrated into the programmable keyed portal 550 to direct the user to a website or digital place. Symbols outside digits 0, 1, 2, . . . 9 may be any string of symbols from the keys available on the programmable keyed portal 550 as a string of any symbols. In embodiments, the programmable keyed portal may include a variety of other possible inputs such as a directory input 552 which may be selected and may direct the user to a directory of code strings each associated with a particular website or virtual place. In embodiments, the directory may be pre-populated with a plurality of code strings. Additionally, the directory input 552 may be configured to call an open channel line, wherein the open channel line is accessible to all who have access to tag(s) 546/QR code(s) 544. For example, attendees of the event, such as a wedding, and those that received the gift bag may have access to the tag 546/QR code 544. After obtaining access and opening up the programmable keyed portal, those who choose to call the open line, via the directory input 556, may speak with each other via the open call line[RLS2].

In embodiments an interactive aggregator 554 aggregates content from digital target channels (e.g., 560, 562, 564, 566) associated with the programmable keyed portal 550. In embodiments an interactive aggregator 554 aggregates content from digital target channels (e.g., 560, 562, 564, 566) associated with the programmable keyed portal 552 and plays them in an order that is dictated by a relational scheduling algorithm (e.g., in a predetermined priority order based on user preferences). In embodiments an interactive aggregator 554 aggregates content from digital target channels (e.g., 560, 562, 564, 566) associated with the programmable keyed portal 552 and plays them in an order that is dictated by a relational scheduling algorithm that learns what content each user prefers and provides each user with the most preferable content on the basis of the user's preferences. In embodiments an interactive aggregator 554 aggregates content from digital target channels (e.g., 560, 562, 564, 566) associated with the programmable keyed portal 552 and plays them in an order that is dictated by a relational scheduling algorithm that learns what content users prefer with a genetic algorithm. In embodiments an interactive aggregator 554 aggregates content from digital target channels (e.g., 560, 562, 564, 566) associated with the programmable keyed portal 552 and plays them in an order that is dictated by a relational scheduling algorithm that learns what content users prefer by utilizing a genetic algorithm comprised of a randomization function and selection criteria. In embodiments an interactive aggregator 554 aggregates content from digital target channels (e.g., 560, 562, 564, 566) associated with the programmable keyed portal 552 and plays them in an order that is dictated by a relational scheduling algorithm that learns what content and categories of content users prefer by utilizing a genetic algorithm comprised of a randomization function that offers content and categories of content in new sequences and selection criteria that are used to select for sequences of content, and for example categories, that maximize user engagement.

In embodiments, the programmable keyed portal may include a start/stop input 558 or a reset input 559, or both. The start/stop input 558 is configured to start and stop music (facilitated/gathered through the aggregator 554). The reset input is 559 configured to reset music facilitated by the aggregator 554 or reset a partial code string inputted by a user.

In embodiments, the autograph area can comprise a QR code, near field communication tag or chip, or an RFID tag associated with a personalized website or social network.

In embodiments, an article may include a tag that enables a person with an autograph pen in hand to autograph the article, for example a shirt. By providing the autographed shirt to a fan, the fan may follow a link to a website or digital place associated with the tag. In embodiments, an article may include a tag that enables a person with an autograph pen in hand to autograph an article, for example a shirt, with one or more accompanying codes. In embodiments, the code may be written on the tag from the signer, provided vocally, written separately, or the like. By providing the autographed shirt to a fan, the fan may follow a link to a website or digital place associated with the tag and enter a code to reach another website or digital place.

In embodiments, an autograph area of a shirt or article of clothing can be less stretchy, have a higher modulus, and be less absorbent than the rest of the article on which the autograph area is placed to facilitate writing with a pen or other writing instrument on the autograph area. In embodiments, an autograph area may be printed, labeled, tagged, removably tagged, applied, or the like.

Additional Event Specific Social Network:

In embodiments, a register stand of plastic bags may be fastened with hidden or visible QR codes. Other examples include displaying or incorporating the tokens on the outside of objects, revealing them secretly or given through a sales agent. In embodiments, tokens may be displayed for distribution such that the tokens may be taken, scanned, or otherwise utilized next to a register, entrance or exit during an event. For example, a presentation stand may be set up for wedding products. The QR codes may map to the examples incorporated herein, such as to a user's own OwnSocial builder or a secret key, in which information may be shared or purchases made. In embodiments, a "scratch-off" or "peel-off" may be implemented to access a secret key, which directs to a website, social network, or other informative platform. In embodiments, multiple sets of tokens or QR codes may be implemented for individuals or groups of individuals associated with a particular event. For example, continuing with the wedding concept, a set of tokens or QR codes may comprise a set of three, wherein one token or set of tokens may direct to websites/social networks/etc. for one side of the wedding party ("his"), another token or set of tokens may direct to websites/social networks/etc. for another side of the wedding party ("hers") and a third token or set of tokens may direct to websites/social networks/etc. for both sides of the wedding party ("theirs").

Figure 6:
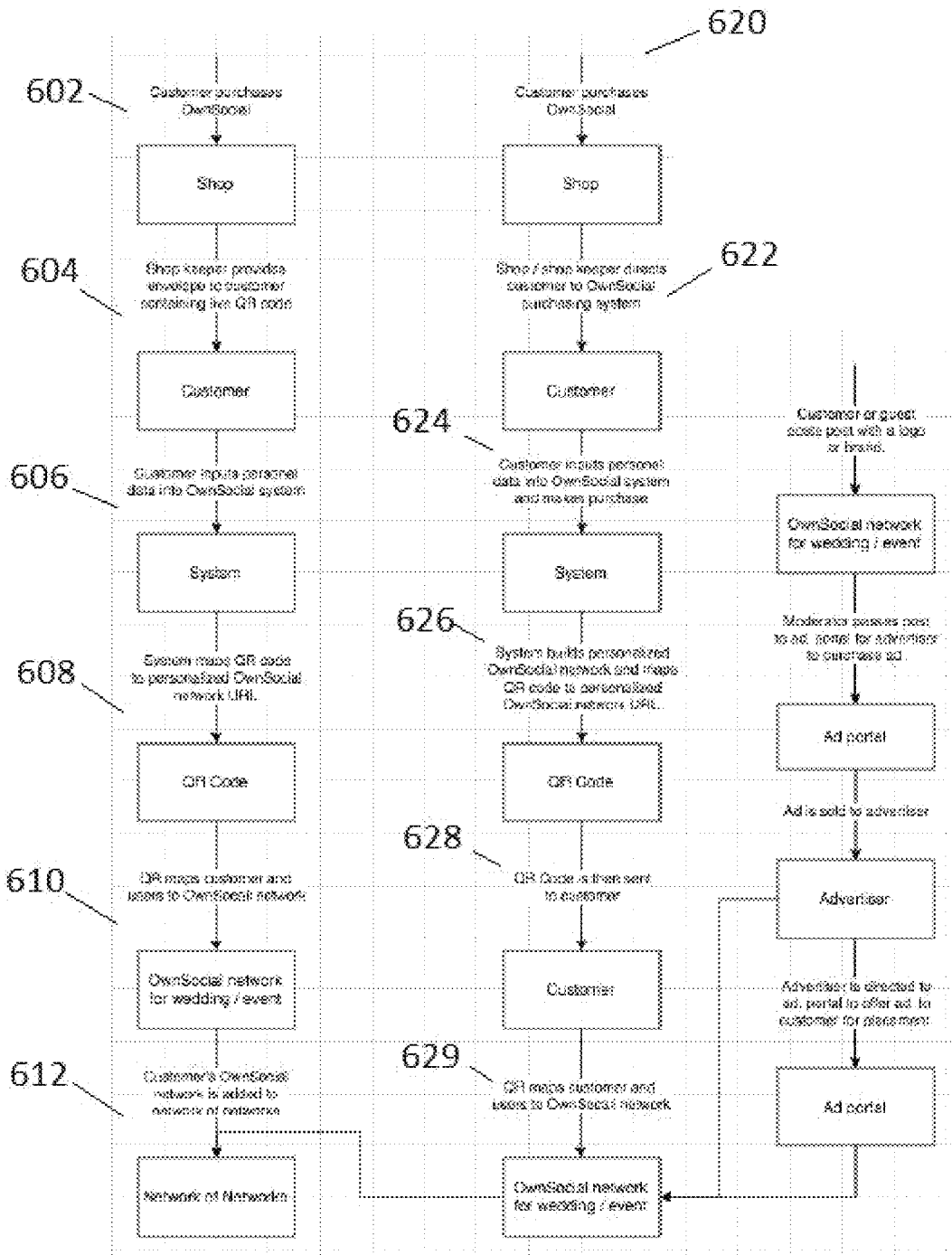
FIG. 6 is a flow chart of a digital menu, according to an embodiment.

FIG. 6 depicts a flow chart of a method of organizing a personalized social network, according to an embodiment. In embodiments, such implementation may include building active social networks and attaching QR codes that map to active social networks to materials that are stored within envelopes 604 after purchase 602. The envelopes may be sold to wedding shops, who then sell active social networks to customers. In embodiments, the customer or the wedding shop may then update the social network with the customer's personal information 606. The QR code may be reassigned to the customer's URL 608. In embodiments, QR codes may then be printed by wedding shops on invitations, invitation inserts, save the dates, table cards, or the like 612. Optionally, custom design services may be sold and administered separately.

In embodiments, such implementation may include building inactive social networks, attaching QR codes that map to inactive social networks to materials that are stored within envelopes 620. For example, envelopes may be sold to wedding shops, who then sell inactive social networks to customers. In embodiments, the wedding shop or facilitator may then activate the social network for the customer and the customer may be directed to the inactive social network for activation 622. In embodiments, the customer may activate the social network for the gift recipient or the couple that is marrying. In embodiments, the customer, wedding shop or gifter may update the social network with the customer's personal information 624. In embodiments, the system builds personalized social network and reassigns the QR code to the customer's URL 626. The updated QR code may then be sent to the customer 628, which is mapped to the user and users to the active social network 629 for the wedding or other event. In embodiments, QR codes may be printed by the wedding shops on invitations, invitation inserts, save the dates, table cards, or the like. Custom design services may be sold and administered separately.

In embodiments, a method where the social network may be built at or after the point of sale, either by the purchaser, the wedding shop or other professionals for the purchaser or people who are marrying.

Photo Wall:

In an embodiment of the present disclosure, a picture wall can be virtually recreated on a website or personal social network. The picture wall can be enabled by a QR code, near field communication tag or chip applied to a surface that is representative of the picture wall. In embodiments, other links or indication of how to access a means to take a photograph and post a photograph to a nearby screen or a website that is representative of the picture wall can be used. In embodiments, pictures may be taken in the vicinity of the surface and automatically added to the virtual picture wall. For example, in a restaurant a picture taken at any table or location in the restaurant premises may be uploaded to the virtual photo wall. In embodiments, such a virtual photo wall can be automatically associated with a website or social media such that photos added to the virtual wall can easily be selectively added to the associated website. In embodiments, any phone or other user device can add pictures to the virtual photo wall. In some embodiments, any phone or user device on the premises can add to the virtual photo wall only so long as the user device is logged into a particular Wi-Fi network. In embodiments, GPS coordinates can be cross checked with the coordinates of the restaurant to ensure the photo being added to the virtual photo wall was taken on the premises. In embodiments, such a system may be used in support of a customer of the month or other program incentivizing customer behavior. In embodiments, a menu of QR codes can be provided to enable the navigation to parts of the site rather than browser menu clicks.

In embodiments, a menu of QR codes, links, and other selection or action methods may be presented to a user who is on a local network or on a remote site. Interactive content from a remote site may post a picture, make a video recording, make an audio recording, notecard, or other media on the event website. Posted event site media content persists as private or public based on the event site owner's choice.

In embodiments, interactive advertising posts may be presented whereby the individual interacting with the advertising posting may be compensated for their time spent learning from the advertising and answering a questionnaire.

In embodiments, optional jobs postings may be realized. A network of jobs needed and jobs available may be filtered and matching methods configured to assist event site owners with finding helpers.

In embodiments, a virtual photo wall can be incorporated into an event such that photos uploaded on the premise of the venue automatically upload to a virtual photo wall corresponding to the event. In an embodiment, a set of tokens of the present disclosure can be associated with a virtual photo wall such that photos taken within range of a token may be uploaded to the associated virtual photo wall.

Digital Menu:

In embodiments, photos may be posted to private space (behind a forced login) upon interaction by a user/users, or after login. Photos may be made public so guests do not all have to login. In embodiments, the programmable keyed portal key interface for keypad entry/keypad access may be utilized.

Digital menu enables data feeds into other social networks that further enables serving adjacent communities including the homeless.

Digital menu enables competition possibilities possible with 'digital menu:' degree of spiciness, spiciness leaderboard, food consumption.

Alcohol ordering is enabled by enabling the user to input their driver's license and by further enabling the cross referencing of the driver's license photo with a photo taken at, before, or near time of purchase or delivery of an alcoholic beverage or other restricted or age restricted product.

Digital menu enables complaint, compliment, or service call registration, food examples provided: Cold, Too spicy, Call button, Table request, Call button, Phone call button, Interact with phone software, Local wifi network.

Digital menu enables After (post)-visit complaints E.g. service issue, food issue, etc. Restaurant owners' success is often dependent on visitor online reviews. A new restaurant might get one or two bad reviews, and see a significant decline in patronage as a result. Providing a controlled outlet for negative feedback reduces the likelihood of visitors publicly disparaging a particular establishment.

Digital menu enables better scheduling for: workers and managers, future scheduling, predictive analytics based on specific party and how long they normally stay, table availability forecasting.

Digital menu enables easy deployment of rewards programs including drawing rewards.

Digital menu serves pain points including a previously shown or favorite order off of the menu by making the menu historically searchable and expiration of order/offer visible. Digital menu helps staff to know their customers and better adapt to their needs.

Digital menu serves staff or systems that serve the purpose of people including but not limited to servers or waitstaff, managers, general managers, trainers, chefs, table bussers, people who garnish plates, food delivery people, people who inventory and order food.

Digital menu is relevant to people who don't care who their server is and may be looking for minimal interaction. Digital menu is relevant to people who want to maximize their interaction with servers or waitstaff by alleviating the burden on the waitstaff to take orders.

Figure 7:
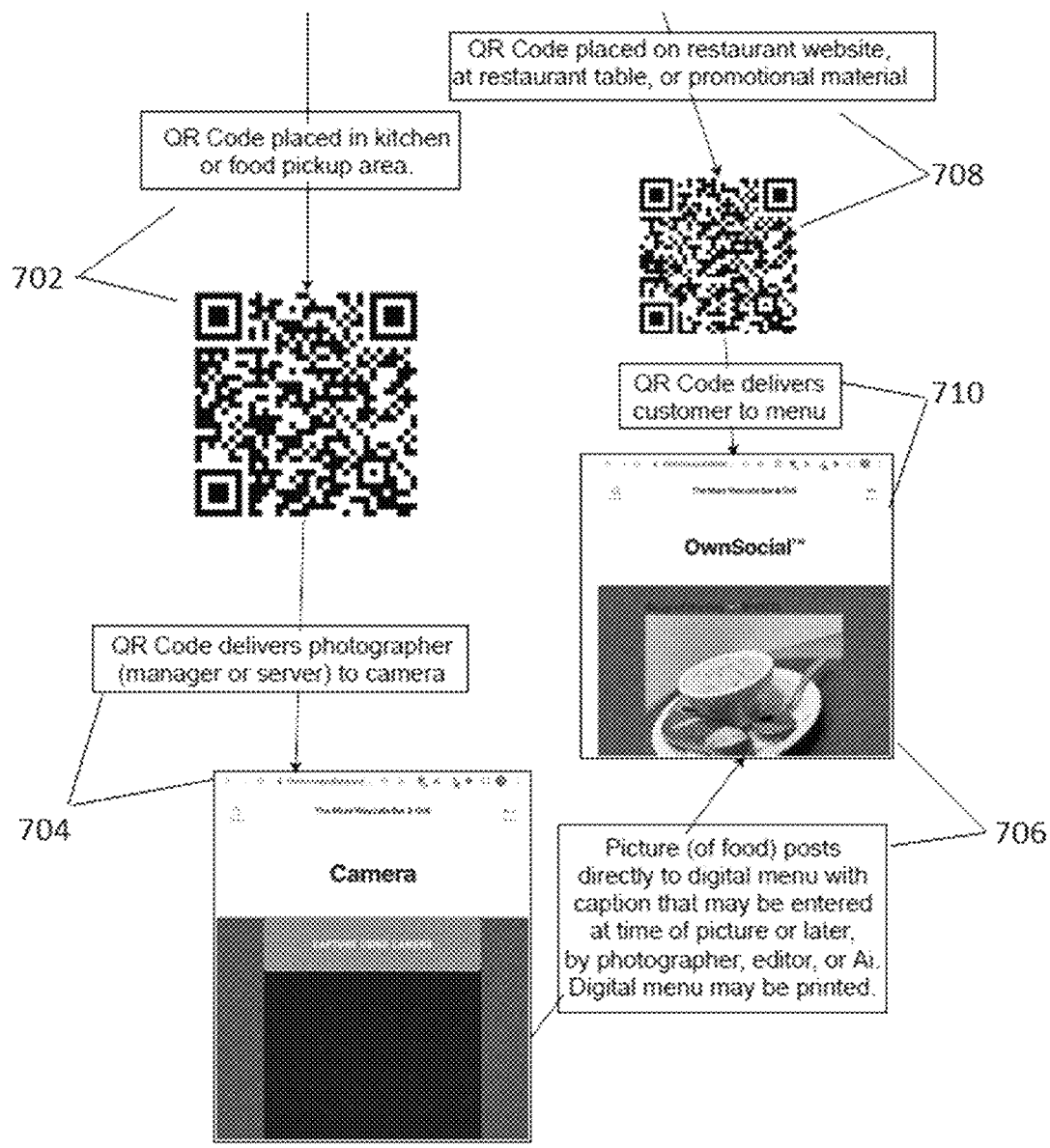
FIG. 7 is a diagram of functionalities of a digital menu, according to an embodiment.

Digital menu enables the easy addition of pictures to a menu. For example, referring to FIG. 7, a tag or QR code, as described herein, may be positioned in or near a kitchen (such as a food pickup window) in a restaurant. In embodiments, an employee (such as a manager or server) may wish to upload a photo to one of or all of the social networks associated with the restaurant to spread the word about new specials, new employees, potential advertisements, etc. Traditional methods require a large amount of time extra photography set. In this instance the employee may scan the code may, which may deliver them to initiate a camera on their digital device. Once one or more pictures have been taken, the pictures may be posted directly to the digital menu (e.g., the restaurant's "OwnSocial" network) with captions that may be entered at time of the pictures being taken, or later by the photographer, an editor or AI. In embodiments, the digital menu may be printable. In embodiments, codes may be placed on the restaurant's website, around restaurant tables, within various promotional materials (e.g., pamphlets, menus, etc.) for potential customers to see and interact with. In embodiments, upon scanning of the code, the code may deliver the customer to the restaurant's website, included within, the photos taken by the employee. In embodiments, the updating of the "OwnSocial" network may be implemented in real-time.

Digital menu enables easy check-in to a restaurant, eg. via an email or notification sent to a diner's phone rather than having to collect, pick-up, carry and or disinfect a beeper. Digital menu maximizes use by offering incentives eg. a free beverage if a diner logs on to the digital menu site and provides an email address, or by texting the user with a discount opportunity.

Digital menu affords longer menu enabling inclusion of allergens, preparation, recipe, who likes it, past celebrity orders, etc. Digital menus are searchable. Phone human interface gestures enable functionality. ie. Sweep left returns to categories. ie. Sweep right to place order. Settings configurable for each user. In embodiments, items in the social feed, for example, submitted by a user may subsequently be purchased by another through the post itself (e.g., a person offering a new menu item may upload it to their personal network, then another individual may see the upload and purchase said item directly from the post).

Notification of special/soup of the day sent to customers phone. Notifications of user/friend groups, when everyone "checks in." Notification could be provided to friends who meet regularly at the time that each person needs to leave to arrive at the same time. Could integrate with the map/direction software function.

When a person or group jumps in the back of a taxi or other ride service, restaurants or other establishments can bid on their arrival at their restaurant or establishment. Utilize data to create destination or journey or experience service optionally with a rating system.

Provide door to door rides pickup and drop-offs for partygoers.

Customer to create profile with unique QR. Ai captures favorites and follows up with matches. Menu adaptation for regulars.

Meeting space services Based on minimal and total tables Services Equipment Audio/video recordings.

Restaurant automation maximizes time for social interaction between customer and staff. Restaurant automation maximizes availability of staff to maximize quality of experience. Restaurant automation maximizes availability of staff to respond to a "call," button. Call button feeds into quality control system. "Like," button feeds into quality control system. Call button or like button plus or minus rating feeds into quality control system. Rating may include a "handshake," between the staff and the restaurant. Video chat between customer and establishment. Video chat could be used for quality control/call button. "I'll send someone right away."

Post storage or recycling based upon restaurant ingredient ordering or past service or behavior. Genetic algorithms with randomization and selection criteria or other machine learning algorithms or capabilities may be used to maximize profitable revenue. Dynamic pricing algorithms. Data may be sold or otherwise made available to vending machine loaders based upon people's restaurant ordering behavior. People may be rewarded for offering their data to vending machine loaders.

Figure 8:
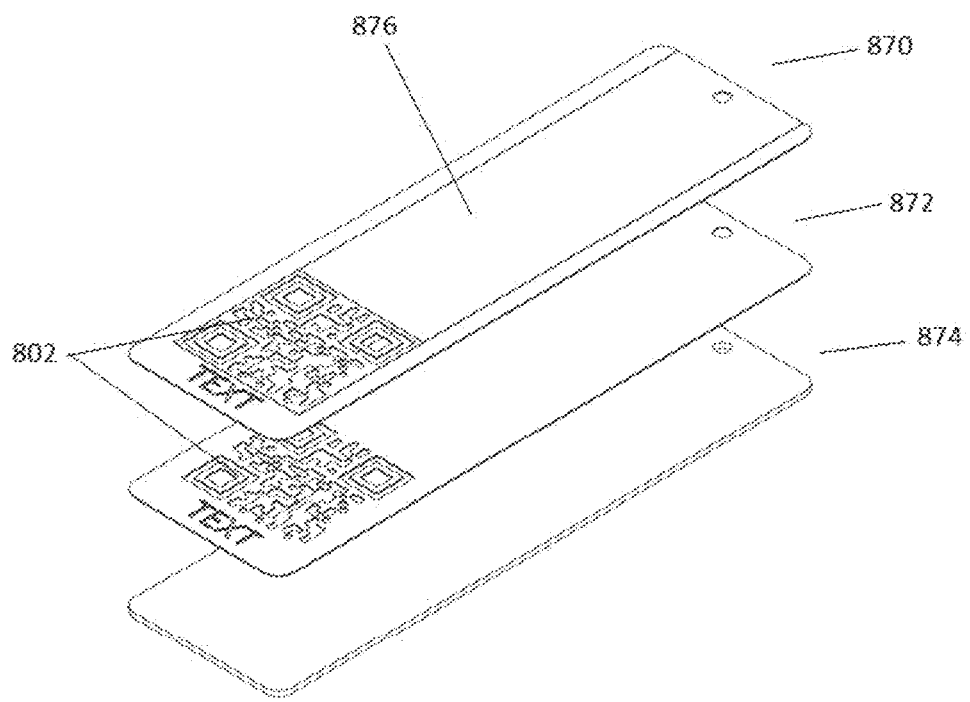
FIG. 8 is an illustration of an autograph tag, according to an embodiment.

Autograph Tag:

FIG. 8 is an illustration of an autograph tag, according to an embodiment. The tag including a first layer 870, a second layer 872 and a third layer 874. The first layer 870 may include a QR code 802 integrated with the first layer. In embodiments, the QR code 802 may be etched through the first layer. In embodiments, the first layer 870 may include a personalization area 876 such that, once a removable film (not shown) is removed, a user may write/draw or otherwise include at least one of a signature or code string for programmable keyed portal input. In embodiments, the removable film may include tape, adhesive plastic, etc. and may cover the entire first layer 670 or only a portion of the first layer 870 (e.g. the removable film covering the personalization area 876). In embodiments, the personalized area 876 may be recessed, compared to the remaining portions of the first layer 870 to avoid possible damage (e.g., scratching, smudging, tearing, wear/damage to the signature/code string, etc.) of the personalized area 876. Second layer 872 may include the QR code 802. In embodiments, third layer 874 is comprised of a material that supports and protects the tag's overall structural integrity (e.g., provides support so as to not bend, break or otherwise ruin the tag).

Open Posting:

In embodiments, a personalized social network can facilitate "open posting," whereby a social network can be edited without a user logging in. In embodiments, a tag or QR code may be scanned, and a user may be directed directly to a website or digital place, wherein no login code or programmable keyed portal entry is required (i.e., the portal is "open" to those accessing it). For example, one or more of these tags or codes may be scattered throughout an event, such as a wedding. Attendees of the wedding may scan the tag or QR code and be directed to a social network specifically related to the event. In embodiments, people may upload photos, videos, share information about the wedding, and even purchase various products (e.g., wedding gifts). In embodiments, purchasing is capable because the social network may be a live network of networks (as described in FIG. 1) that may be accessible from one to the other in real time. Open post features can include un-publishing posts from the feed of a social network, website, or other digital place, changing content such as titles, descriptions, text, or other content, or moving the place in the feed. In embodiments, open post available features may be toggled on and off by the owner of the social network or logged-in users that have been granted special privileges. Access to open posting may be password protected with a user specific password or a common password that is shared between users.

In embodiments, an input field on a social network can expand into or otherwise open an input menu. The input menu enables a user who is not logged into the site to moderate content on the site. In embodiments a user can un-publish a post or edit text.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Figure 9:
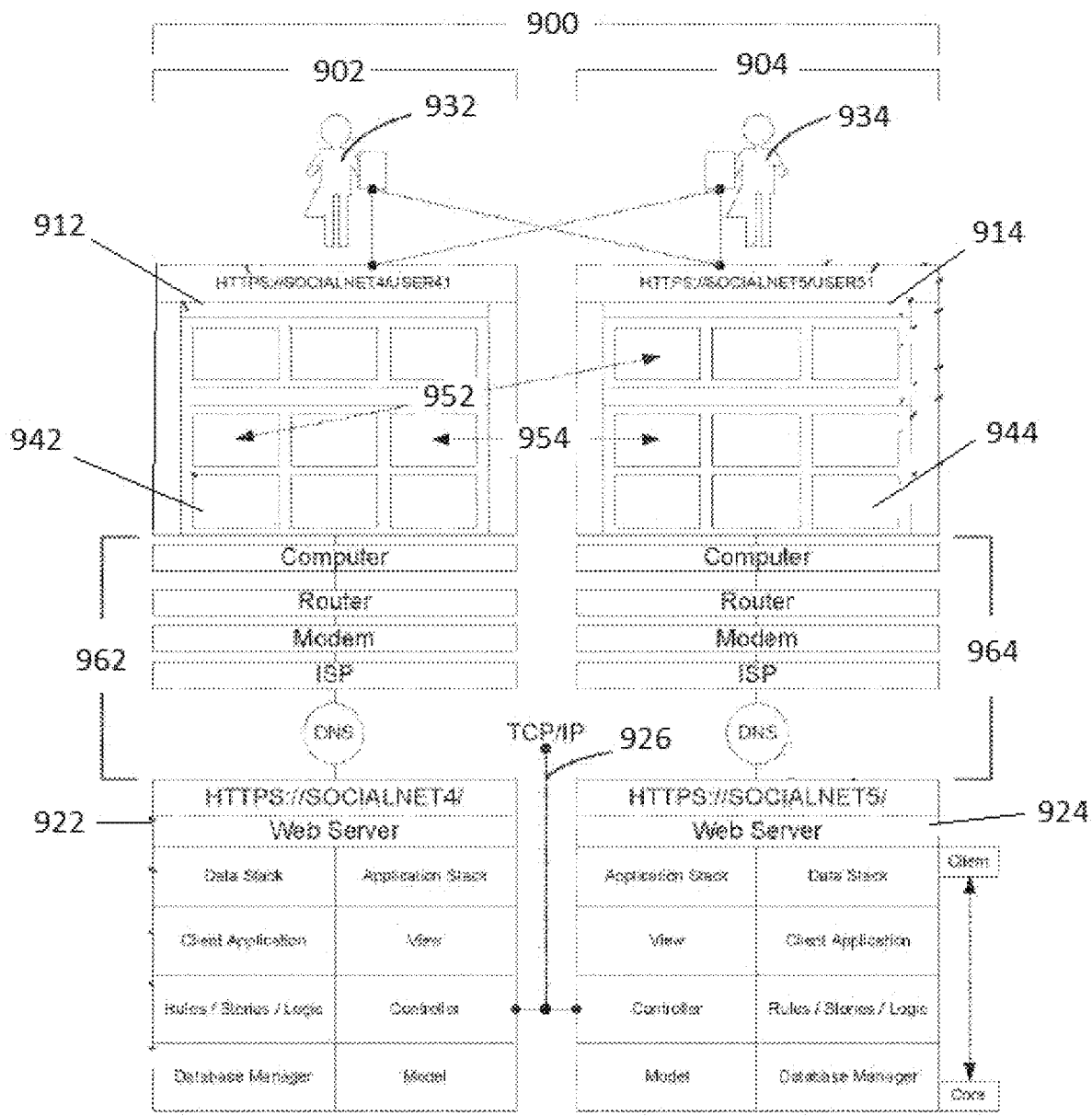
FIG. 9 is an illustration of a decentralized social network architecture, according to an embodiment.

Example Embodiment of a Decentralized Social Network Architecture:

FIG. 9 illustrates an embodiment of a decentralized social network architecture, as described herein. A shared data platform 900 is comprised of one or more social networks 902 and 904, each comprising a user interface 912 and 914. In embodiments, each user interface 912 and 914 communicatively coupled a to web servers by means such as any combination of a computer, router, modem, an internal service provider (ISP) and domain name system (DNS) 962 and 964 and each web server 926 communicatively coupled. The shared data platform 900 of the present invention permits connected social networks 902 and 904 to share users 932 and 934 who may pass between each social network to manage content 942 and 944 with a single set of user credentials and a single or multiple avatars. As a differentiation from social network aggregators, the shared data platform operates to create a first level of connectivity between social networks facilitating similar cultures or user behaviors and a second level of connectivity between or ruleset for other social networks. In embodiments, web servers 922 and 924 connect with each other via TCP/IP 908 permit communication of content 952 and 954 between social networks 902 and 904. Web servers 922 and 924 may be additionally connected to social networks not considered to be on the shared data platform 900, but instead that serve those on the shared data platform with subsets of relevant information, such as events or highlights that may be posted or may be originated elsewhere. In embodiments, a serverless framework may be included in addition to or in leu of a server framework.

Figure 10:
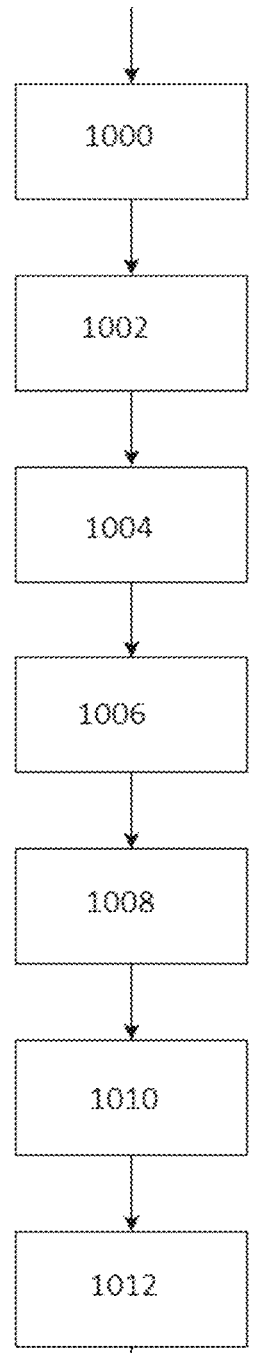
FIG. 10 is a flow chart of an example interaction utilizing the decentralized social network architecture, according to an embodiment.

Example Embodiment of an Interaction Utilizing a Decentralized Social Network Architecture FIG. 10 is a flow chart of an example interaction utilizing the decentralized social network architecture.

At step 1000, a user (user A) may access a website, such as a restaurants website, for the first time. In doing so, the website may provide its public key to the user's browser. In embodiments, the user (user A) may choose to set up and own their own unique username/website associated with the particular website. Public and private keys may be generated and stored in browser local storage with the user's unique username.

At step 1002, the user's (user A) browser may encrypt their public key using the associated website's public key and their own private key. The associated website may decrypt the payload, from the user's device to the website, using its private key, via transmission wrapper. The transmission wrapper ensuring the contents and source of transmission are not compromised. The user's (user A) username and public key becoming apart of and listed in a directory at the associated website.

At step 1004, the user (user A) may come into contact with other user's (user B), for example at an event such as a trade show, wedding, concert, etc. In embodiments, the other user (user B) may want to connect, in which case the user may display a QR code (e.g. via cell phone, printed tag, etc.), associated with the user's (user A) own username/website. The other user (user B) may scan the QR code and may open a browser to the user's (user A) own username/website.

At step 1006, in embodiments, the other user (user B) visits the particular website (e.g., the same restaurant website as user A in step 1000) for the first time. The website may provide its public key to the other user's (user B) browser and the website may provide user's (user A) public key to the other user's (user B) browser. In embodiments, the other user (user B) may choose a unique username associated with the particular website (e.g., similar to user A's set up of a unique username/website in step 1000), in which case public and private keys may be generated and stored in browser local storage with the other user's (user B) username.

At step 1008, the other user's (user B) browser may encrypt their public key using the associated website's public key and their own private key. The associated website may decrypt the payload, from the user's device to the website, using its private key, via transmission wrapper. The transmission wrapper ensuring the contents and source of transmission are not compromised. The other user's (user B) username and public key becoming apart of and listed in a directory at the associated website.

At step 1010, the other user (user B) may initiate communication with, now connected, user (user A), such as authoring a message. The message may be encrypted with the other user's (user B) private key and the user's (user A) public key. In embodiments, the encrypted message may be wrapped with the public key of the associated website with the other user's (user B) public key. The transmission wrapper ensuring the source and contents of the message are uncompromised. In embodiments, the initial encryption ensuring only the user (user A) can decrypt and read the message sent by the other user (user B).

At step 1012, the other user's browser (user B) may submit the addressed, wrapped and encrypted message to the associated webpage. The associated webpage may unwrap the transmission using it private key and the other user's (user B) public key. The associated website may wrap the message using it private key and the user's (user A) public key. The user (user A), may then receive a notification, such as a web push notification, from the associated website, indicating a new message has been received. The user (user A) may retrieve the message and unwrap it using the user's (user A) private key and the associated website's public key. The user (user A) may then decrypt the payload using the user's (user A) private key and the other user's (user B) public key. The user (user A) may read the message clearly, confident that the message originated from the other user (user B) (i.e., the message was successfully decrypted using the other user's public key). In embodiments, no one with access to the associated website's admin or database can see or alter the message.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A decentralized social networking system, comprising:
one or more tags, a programmable keyed portal, at least two target digital platforms and an aggregator;
the one or more tags each integrated with a QR code, wherein the QR code is associated with the at least two target digital platforms, each target digital platform with a unique URL, and a personalization area, wherein information associated with the at least two target digital platforms may be integrated;
the programmable keyed portal including a plurality of inputs, wherein a selection of inputs are entered into the programmable keyed portal such that the entered selection of inputs transports a user from the programmable keyed portal to one of the at least two digital platforms based on the integrated information;
an aggregator configured to aggregate content from at least one of the at least two target digital platforms.

2. The decentralized social networking system of claim 1, wherein each of the one or more tags include a first layer, a second layer and a third layer, wherein at least a portion of the first layer is a removable film.

3. The decentralized social networking system of claim 1, wherein the plurality of inputs of the programmable keyed portal are buttons ranging from 0-9 and are associated with the integrated information.

4. The decentralized social networking system of claim 3, wherein the programmable keyed portal further comprises three additional inputs, wherein a first additional input is configured to start or stop playing music by the aggregator; a second additional input is configured to reset music played by the first additional input and reset the programmable keyed portal to accept a new input; and a third additional input is configured to present a directory of at least two pre-associated inputs, each associated with the at least two or more target digital platforms.

5. The decentralized social networking system of claim 4, wherein the third additional input is further configured to provide a communicative linkage between two or more users of the one or more tags.

6. The decentralized social networking system of claim 3, wherein the programmable keyed portal further comprises an additional input configured to call and present the aggregator, wherein the aggregator is interactive for the user.

7. The decentralized social networking system of claim 1, wherein, the programmable key portal requires an authentication input from a user.

8. The decentralized social networking system of claim 1, wherein a stop button is implemented as an additional input such that, when activated by the user, action, behavior, or performance of one or more of the at least two target digital platforms is halted.

* * * * *